US008568217B2

(12) United States Patent
Tam

(10) Patent No.: US 8,568,217 B2

(45) Date of Patent: Oct. 29, 2013

(54) METHOD OF GAMING AND A GAME CONTROLLER

(75) Inventor: Billy Ho Ching Tam, Killara NSW (AU)

(73) Assignee: Aristocrat Technologies Australia Pty Limited (AU)

( * ) Notice: Subject to any disclaimer, the term of this patent is extended or adjusted under 35 U.S.C. 154(b) by 156 days.

(21) Appl. No.: 13/110,502

(22) Filed: May 18, 2011

(65) Prior Publication Data

US 2012/0295687 A1 Nov. 22, 2012

(51) Int. Cl.

*A63F 9/24* (2006.01)

*A63F 13/00* (2006.01)

(52) U.S. Cl.

USPC .................................. 463/20; 463/21; 463/25

(58) Field of Classification Search

USPC ........................................................... 463/20

See application file for complete search history.

(56) References Cited

U.S. PATENT DOCUMENTS

| | | | | |
|---|---|---|---|---|
| 5,984,782 | A * | 11/1999 | Inoue | 463/20 |
| 5,997,401 | A * | 12/1999 | Crawford | 463/20 |
| 6,251,013 | B1 * | 6/2001 | Bennett | 463/13 |
| 6,375,570 | B1 * | 4/2002 | Poole | 463/31 |
| 6,517,432 | B1 * | 2/2003 | Jaffe | 463/16 |
| 6,786,818 | B1 * | 9/2004 | Rothschild et al. | 463/20 |
| 6,805,632 | B2 * | 10/2004 | Suda | 463/25 |
| 7,077,745 | B2 * | 7/2006 | Gomez et al. | 463/20 |
| 7,195,559 | B2 * | 3/2007 | Gilmore et al. | 463/20 |
| 7,674,180 | B2 * | 3/2010 | Graham et al. | 463/29 |
| 7,744,454 | B2 * | 6/2010 | Mierau et al. | 463/16 |
| 7,819,737 | B2 * | 10/2010 | Englman et al. | 463/16 |
| 7,896,738 | B2 * | 3/2011 | Okada | 463/20 |
| 7,918,726 | B2 * | 4/2011 | Okada | 463/20 |
| 7,922,574 | B2 * | 4/2011 | Okada | 463/20 |
| 8,105,145 | B2 * | 1/2012 | Jaffe | 463/16 |
| 8,109,823 | B2 * | 2/2012 | Aoki | 463/20 |
| 8,137,179 | B2 * | 3/2012 | Jensen et al. | 463/20 |
| 8,172,665 | B2 * | 5/2012 | Hoffman et al. | 463/20 |
| 8,177,622 | B2 * | 5/2012 | Englman | 463/20 |
| 8,192,272 | B2 * | 6/2012 | Thomas et al. | 463/20 |
| 8,246,447 | B2 * | 8/2012 | Gauselmann | 463/25 |
| 8,277,307 | B2 * | 10/2012 | Jensen et al. | 463/20 |
| 2003/0064779 | A1 * | 4/2003 | Suda | 463/20 |
| 2005/0037836 | A1 * | 2/2005 | Gilmore et al. | 463/25 |
| 2005/0130731 | A1 * | 6/2005 | Englman et al. | 463/20 |
| 2005/0130737 | A1 * | 6/2005 | Englman et al. | 463/25 |
| 2008/0085771 | A1 * | 4/2008 | Iddings et al. | 463/42 |
| 2008/0096639 | A1 | 4/2008 | Okada | |
| 2009/0117990 | A1 * | 5/2009 | Englman et al. | 463/20 |
| 2009/0131145 | A1 * | 5/2009 | Aoki et al. | 463/20 |
| 2010/0029368 | A1 * | 2/2010 | Hornik et al. | 463/20 |
| 2011/0003629 | A1 * | 1/2011 | Englman et al. | 463/20 |
| 2011/0086695 | A1 * | 4/2011 | Evans | 463/20 |

* cited by examiner

*Primary Examiner* — Steven J Hylinski

(74) *Attorney, Agent, or Firm* — McAndrews, Held & Malloy, Ltd.

(57) ABSTRACT

A gaming system. A symbol selector selects a plurality of symbols for display at display positions. A symbol hierarchy evaluator evaluates the selected symbols to identify a column corresponding to a highest winning symbol combination to be applied to one of the columns. A column selector selects a column to apply the designated modification. A display modification element selector selects a designated number of display modification elements to be in a subset of the plurality of display elements changed to an active state. A modification applier applies the designated modification to the selected column subsequent to changing the subset of display modification elements to an active state. A symbol evaluator evaluates the symbols displayed at the display positions subsequent to the modification being applied to determine whether to make one or more awards.

64 Claims, 8 Drawing Sheets

METHOD OF GAMING AND A GAME CONTROLLER

RELATED APPLICATIONS

[Not applicable]

FEDERALLY SPONSORED RESEARCH OR DEVELOPMENT

[Not applicable]

MICROFICHE/COPYRIGHT REFERENCE

[Not applicable]

BACKGROUND OF THE INVENTION

This invention relates to a method of gaming, a gaming system and a game controller.

Gaming systems, such as electronic gaming machines, are known where one or more selected symbols are modified if a condition is met during play of a game.

While such gaming systems provide players with enjoyment, a need exists for alternative gaming systems in order to maintain or increase player enjoyment.

BRIEF SUMMARY OF THE INVENTION

In a first aspect, the invention provides a method of electronic gaming comprising:

(a) displaying a plurality of symbol display positions on a display, the display positions being arranged in a plurality of columns;

(b) displaying a plurality of display modification elements in association with respective ones of each of the plurality of columns;

(c) selecting a plurality of symbols for display at the plurality of display positions;

(d) evaluating the selected symbols based on a symbol combination hierarchy to attempt to identify a column corresponding to a highest winning symbol combination in the symbol combination hierarchy which would be completed by a designated modification of one or more symbols to be applied to one of the columns;

(e) selecting a column in which to apply the designated modification;

(f) selecting a designated number of the plurality display modification elements to be in a subset of the plurality of display elements changed to an active state, the selection being performed so as to include the display element corresponding to the selected column and any display modification element corresponding to the column identified by the evaluation;

(g) changing display of the selected subset of display modification elements to an active state;

(h) applying the designated modification to the selected column subsequent to changing the subset of display modification elements to an active state; and (i) evaluating the symbols displayed at the display positions subsequent to the modification being applied to determine whether to make one or more awards.

In an embodiment, the designated modification is replacement of the one or more symbols in the selected column with a designated symbol.

In an embodiment, the designated symbol is a wild symbol which substitutes with other symbols in the formation of combinations of symbols.

In an embodiment, the method comprises applying the modification to each symbol of the selected column.

In an embodiment, selecting symbols for each column comprises selecting symbols from respective ones of a plurality of sets of symbols corresponding to respective ones of the columns.

In an embodiment, the modification further comprises modifying the symbol set corresponding to the selected column such that in a subsequent selection of symbols for display at the symbols, the symbol set includes any prior modification.

In an embodiment, each symbol set corresponds to a reel of symbols arranged in a defined order.

In an embodiment, the method comprises conducting a plurality of game rounds, each comprising steps (a) to (i).

In an embodiment, the plurality of game rounds are conducted in response to a trigger condition being met in a base game.

In an embodiment, there are five columns of display positions such that there are five display modification elements and three display modification elements are changed to the active state.

In an embodiment, changing display of the display modification elements to an active state comprises changing the display from a dormant state change to an active state.

In an embodiment, the method comprises changing display of the display modification element corresponding to the selected column to an award state as part of applying the designated modification.

In an embodiment, each display modification element is an animated volcano.

In an embodiment, the symbols are evaluated in step (i) based on a defined order of the columns.

In an embodiment, the symbols are evaluated left to right.

In an embodiment, the evaluation of the selected symbols in step (d) is based on the defined order of columns.

In an embodiment, each symbol combination in the symbol combination hierarchy comprises a plurality of the same symbol, different numbers of the same symbol are winning combinations, and there are winning combinations of symbols corresponding to different symbols.

In an embodiment, the symbol hierarchy is defined by the symbols such that attempting to identify a highest winning symbol combination in the symbol hierarchy comprises attempting to identify a symbol combination corresponding to a highest winning number of a highest symbol in the symbol hierarchy and each winning number of the highest symbol is evaluated prior to evaluating winning numbers of the next symbol in the symbol hierarchy.

In an embodiment, the symbol hierarchy is defined by both the symbols and the number of symbols such that attempting to identify a highest winning symbol combination in the symbol hierarchy comprises attempting to identify a symbol combination corresponding to a highest winning number of symbols starting with a highest symbol in the symbol hierarchy and proceeding to the next highest each winning number of the highest symbol subsequent to evaluating the highest winning number of symbols in respect of all symbols in the symbol hierarchy.

In an embodiment, step (f) comprises randomly selecting sufficient display modification elements to complete the designated number by supplementing the display element corresponding to the selected column and any display modification element corresponding to the column identified by the evaluation.

In an embodiment, step (e) precedes at least step (d).

In a second aspect, the invention provides a gaming system comprising:

- a display arranged to display a plurality of symbol display positions on a display, the display positions being arranged in a plurality of columns and a plurality of display modification elements in association with respective ones of each of the plurality of columns;
- a symbol selector arranged to select a plurality of symbols for display at the plurality of display positions;
- a symbol hierarchy evaluator arranged to evaluate the selected symbols based on a symbol combination hierarchy to attempt to identify a column corresponding to a highest winning symbol combination in the symbol combination hierarchy which would be completed by a designated modification of one or more symbols to be applied to one of the columns;
- a column selector arranged to select a column in which to apply the designated modification;
- a display modification element selector arranged to select a designated number of the plurality display modification elements to be in a subset of the plurality of display elements changed to an active state, the selection being performed so as to include the display element corresponding to the selected column and any display modification element corresponding to the column identified by the evaluation, the display of the selected subset of display modification elements on the display being changed to an active state;
- a modification applier arranged to apply the designated modification to the selected column subsequent to changing the subset of display modification elements to an active state; and
- a symbol evaluator arranged to evaluate the symbols displayed at the display positions subsequent to the modification being applied to determine whether to make one or more awards.

In an embodiment, the designated modification is replacement of the one or more symbols in the selected column with a designated symbol.

In an embodiment, the designated symbol is a wild symbol which substitutes with other symbols in the formation of combinations of symbols.

In an embodiment, the modification applier applies the modification to each symbol of the selected column.

In an embodiment, the symbol selector selects symbols for each column by selecting symbols from respective ones of a plurality of sets of symbols stored in a memory of the gaming system, the sets of symbols corresponding to respective ones of the columns.

In an embodiment, the modification applier modifies the symbols of the symbol set stored in memory for the respective column such that in any subsequent selection of symbols for display at the symbols, the symbol sets include any prior modification.

In an embodiment, each symbol set corresponds to a reel of symbols arranged in a defined order.

In an embodiment, the gaming system is arranged to conduct a plurality of game rounds, each of the symbol selector, symbol hierarchy evaluator, column selector, display modification element selector, modification applier and symbol evaluator operating in each of the game rounds.

In an embodiment, the gaming system comprises a trigger monitor arranged to monitor for a trigger condition being met in a base game and to initiate the plurality of game rounds in response to the trigger condition being met.

In an embodiment, there are five columns of display positions such that there are five display modification elements and three display modification elements are changed to the active state.

In an embodiment, changing display of the display modification elements to an active state comprises changing the display from a dormant state change to an active state.

In an embodiment, the gaming system is arranged to change display of the display modification element corresponding to the selected column to an award state as part of applying the designated modification.

In an embodiment, each display modification element is an animated volcano.

In an embodiment, the symbols are evaluated by the symbol evaluator based on a defined order of the columns.

In an embodiment, the symbols are evaluated left to right.

In an embodiment, the evaluation of the selected symbols by the symbol hierarchy evaluator is based on the defined order of columns.

In an embodiment, each symbol combination in the symbol combination hierarchy comprises a plurality of the same symbol, different numbers of the same symbol are winning combinations, and there are winning combinations of symbols corresponding to different symbols.

In an embodiment, the symbol hierarchy is defined by the symbols such that symbol hierarchy evaluator attempts to identify a highest winning symbol by identifying a symbol combination corresponding to a highest winning number of a highest symbol in the symbol hierarchy and each winning number of the highest symbol is evaluated prior to evaluating winning numbers of the next symbol in the symbol hierarchy.

In an embodiment, the symbol hierarchy is defined by both the symbols and the number of symbols such that the symbol hierarchy evaluator attempts to identify a highest winning symbol combination in the symbol hierarchy by attempting to identify a symbol combination corresponding to a highest winning number of symbols starting with a highest symbol in the symbol hierarchy and proceeding to the next highest each winning number of the highest symbol subsequent to evaluating the highest winning number of symbols in respect of all symbols in the symbol hierarchy.

In an embodiment, the display modification element selector randomly selects sufficient display modification elements to complete the designated number by supplementing the display element corresponding to the selected column and any display modification element corresponding to the column identified by the evaluation.

In a third aspect, the invention provides a electronic game controller arranged to:

- (a) control a display to display a plurality of symbol display positions on a display, the display positions being arranged in a plurality of columns;
- (b) control the display to display a plurality of display modification elements in association with respective ones of each of the plurality of columns;
- (c) select a plurality of symbols for display at the plurality of display positions;
- (d) evaluate the selected symbols based on a symbol combination hierarchy to attempt to identify a column corresponding to a highest winning symbol combination in the symbol combination hierarchy which would be completed by a designated modification of one or more symbols to be applied to one of the columns;
- (e) select a column in which to apply the designated modification;

(f) select a designated number of the plurality display modification elements to be in a subset of the plurality of display elements changed to an active state, the selection being performed so as to include the display element corresponding to the selected column and any display modification element corresponding to the column identified by the evaluation;

(g) change display of the selected subset of display modification elements to an active state;

(h) apply the designated modification to the selected column subsequent to changing the subset of display modification elements to an active state; and (i) evaluate the symbols displayed at the display positions subsequent to the modification being applied to determine whether to make one or more awards.

In an embodiment, the designated modification is replacement of the one or more symbols in the selected column with a designated symbol.

In an embodiment, the designated symbol is a wild symbol which substitutes with other symbols in the formation of combinations of symbols.

In an embodiment, the game controller as claimed is arranged to apply the modification to each symbol of the selected column.

In an embodiment, the game controller is arranged to select symbols for each column by selecting symbols from respective ones of a plurality of sets of symbols corresponding to respective ones of the columns.

In an embodiment, the modification further comprises modifying the symbol set corresponding to the selected column such that in a subsequent selection of symbols for display at the symbols, the symbol set includes any prior modification.

In an embodiment, each symbol set corresponds to a reel of symbols arranged in a defined order.

In an embodiment, the game controller is arranged to conduct a plurality of game rounds by repeatedly selecting symbols, evaluating the selected symbols based on a symbol hierarchy, selecting a column, selecting display modification elements, changing display of selected display modification elements, applying the designated modification and evaluating the modified symbols.

In an embodiment, the game controller is arranged to conduct the plurality of game rounds in response to a trigger condition being met in a base game.

In an embodiment, there are five columns of display positions such that there are five display modification elements and three display modification elements are changed to the active state.

In an embodiment, the game controller is arranged to control change of the display modification elements to an active state by changing the display from a dormant state change to an active state.

In an embodiment, the game controller is arranged to control change of the display modification element corresponding to the selected column to an award state as part of applying the designated modification.

In an embodiment, the symbols are evaluated to determine whether to make one or more awards based on a defined order of the columns.

In an embodiment, the symbols are evaluated left to right.

In an embodiment, the evaluation of the selected symbols based on a symbol combination hierarchy is based on the defined order of columns.

In an embodiment, each symbol combination in the symbol combination hierarchy comprises a plurality of the same symbol, different numbers of the same symbol are winning combinations, and there are winning combinations of symbols corresponding to different symbols.

In an embodiment, the symbol hierarchy is defined by the symbols such that the game controller attempts to identify a highest winning symbol combination in the symbol hierarchy by attempting to identify a symbol combination corresponding to a highest winning number of a highest symbol in the symbol hierarchy and each winning number of the highest symbol is evaluated prior to evaluating winning numbers of the next symbol in the symbol hierarchy.

In an embodiment, the symbol hierarchy is defined by both the symbols and the number of symbols such that the game controller attempts to identify a highest winning symbol combination in the symbol hierarchy by attempting to identify a symbol combination corresponding to a highest winning number of symbols starting with a highest symbol in the symbol hierarchy and proceeding to the next highest each winning number of the highest symbol subsequent to evaluating the highest winning number of symbols in respect of all symbols in the symbol hierarchy.

In an embodiment, the game controller is arranged to randomly selecting sufficient display modification elements to complete the designated number by supplementing the display element corresponding to the selected column and any display modification element corresponding to the column identified by the evaluation.

In a fourth aspect, the invention provides a gaming system comprising:

means for displaying a plurality of symbol display positions on a display, the display positions being arranged in a plurality of columns;

means for displaying a plurality of display modification elements in association with respective ones of each of the plurality of columns;

means for selecting a plurality of symbols for display at the plurality of display positions;

means for evaluating the selected symbols based on a symbol combination hierarchy to attempt to identify a column corresponding to a highest winning symbol combination in the symbol combination hierarchy which would be completed by a designated modification of one or more symbols to be applied to one of the columns;

means for selecting a column in which to apply the designated modification;

means for selecting a designated number of the plurality display modification elements to be in a subset of the plurality of display elements changed to an active state, the selection being performed so as to include the display element corresponding to the selected column and any display modification element corresponding to the column identified by the evaluation;

means for changing display of the selected subset of display modification elements to an active state;

means for applying the designated modification to the selected column subsequent to changing the subset of display modification elements to an active state; and means for evaluating the symbols displayed at the display positions subsequent to the modification being applied to determine whether to make one or more awards.

In a fifth aspect, the invention provides a electronic gaming machine comprising:

an electronic display under control of a display controller arranged to (i) control the display to display a plurality of symbol display positions, the display positions being arranged in a plurality of columns, and (ii) control the display to display a plurality of display modification elements in association with respective ones of each of the plurality of columns; and a processor arranged to execute game program code stored in a memory to implement a game controller arranged to:

(a) select a plurality of symbols for display at the plurality of display positions;

(b) evaluate the selected symbols based on a symbol combination hierarchy to attempt to identify a column corresponding to a highest winning symbol combination in the symbol combination hierarchy which would be completed by a designated modification of one or more symbols to be applied to one of the columns;

(c) select a column in which to apply the designated modification;

(d) select a designated number of the plurality display modification elements to be in a subset of the plurality of display elements changed to an active state, the selection being performed so as to include the display element corresponding to the selected column and any display modification element corresponding to the column identified by the evaluation;

(e) change display of the selected subset of display modification elements to an active state;

(f) apply the designated modification to the selected column subsequent to changing the subset of display modification elements to an active state; and (g) evaluate the symbols displayed at the display positions subsequent to the modification being applied to determine whether to make one or more awards.

In a sixth aspect, the invention provides computer program code which when executed by a processor implements the above method.

In a seventh aspect, the invention provides a tangible computer readable medium comprising the computer program code.

BRIEF DESCRIPTION OF SEVERAL VIEWS OF THE DRAWINGS

An exemplary embodiment of the invention will now be described with reference to the accompanying drawings in which.

DETAILED DESCRIPTION OF THE INVENTION

Figure 1:
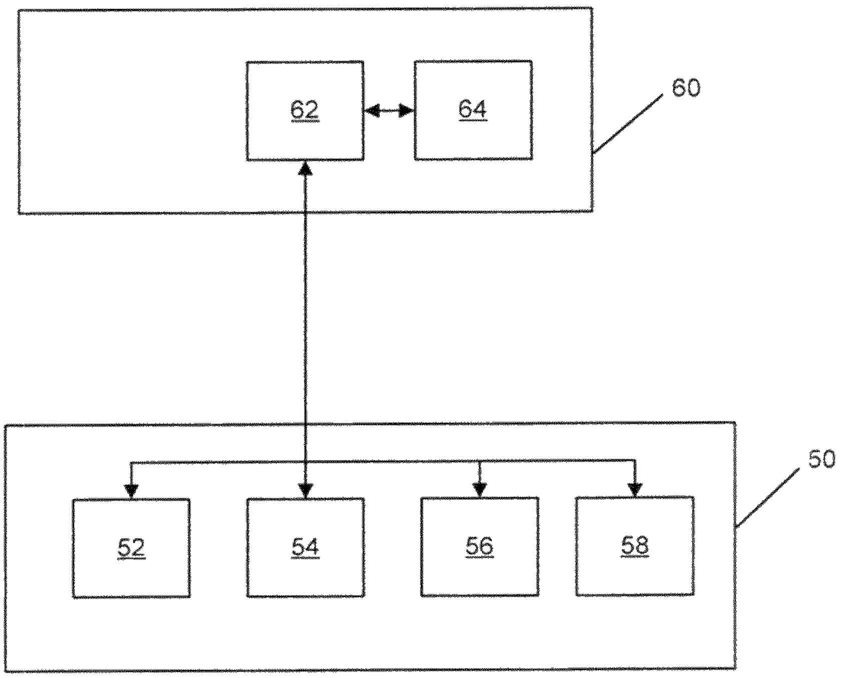
FIG. 1 is a block diagram of the core components of a gaming system.

Referring to the drawings, there is shown a gaming system having a game controller arranged to implement a game where a plurality of display modification elements are displayed in association with respective ones of a plurality of columns of symbol display positions. For example, in an embodiment, where the game is a spinning reel game in which reels are spun to select symbols for display at the symbol display positions, a display modification element is displayed below each reel during a free game feature. During each free game, a subset of the display modification elements are activated including a display modification element corresponding to a selected column which is to be modified and the column which would be most advantageous if it were modified. After one or more symbols are modified, the symbols are evaluated to determine whether to make an award, for example, an award of credits which may be redeemed by the player cashing out.

General Construction of Gaming System

The gaming system can take a number of different forms. In a first form, a stand alone electronic gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaming system has several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions to play the game and observe the game outcomes.

Components of the player interface may vary from embodiment to embodiment but will typically include a credit mechanism 52 to enable a player to input credits and receive payouts, one or more displays 54, a game play mechanism 56 including one or more input devices that enable a player to input game play instructions (e.g. to place a wager), and one or more speakers 58.

The game controller 60 is in data communication with the player interface and typically includes a processor 62 that processes the game play instructions in accordance with game play rules and outputs game play outcomes to the display. Typically, the game play rules are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server. That is a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also know to provide a specific purpose processor using an application specific integrated circuit (ASIC) or a field programmable gate array (FPGA).

Figure 2:
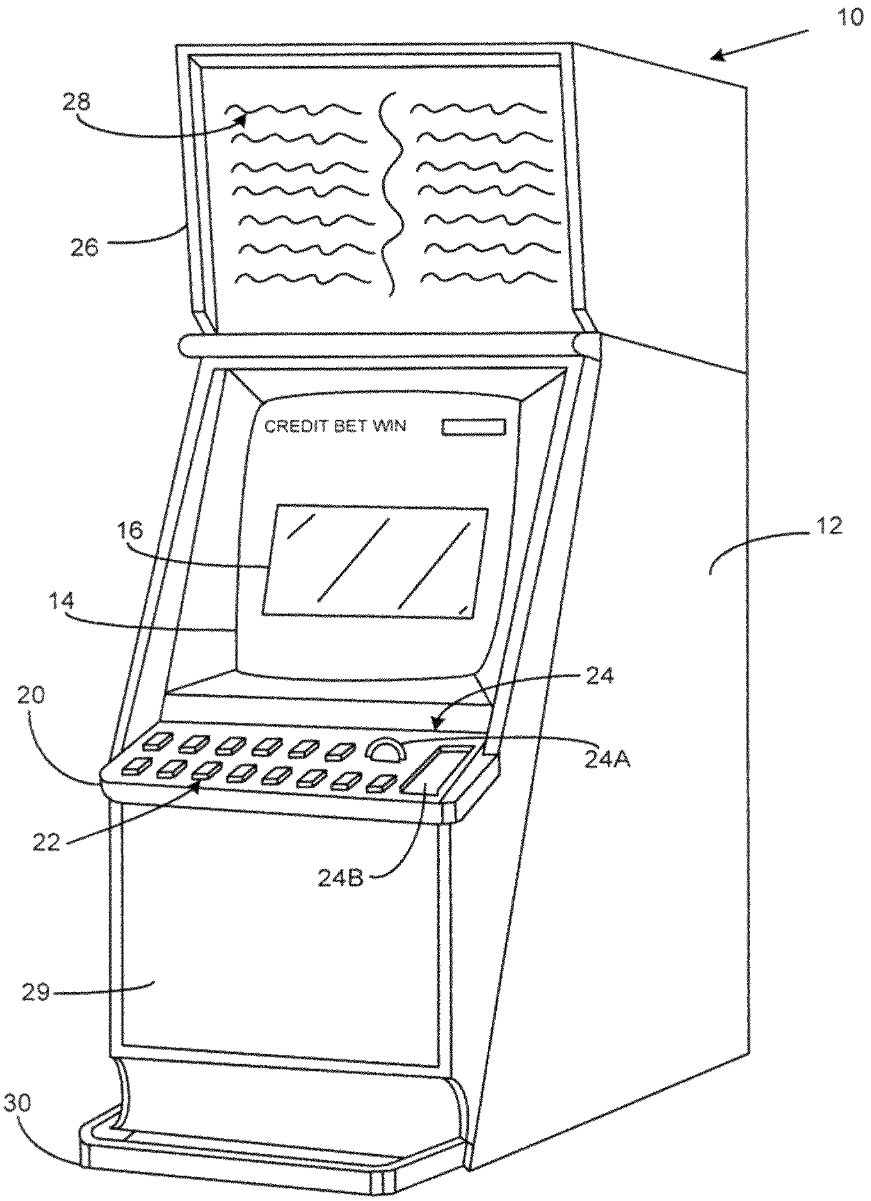
FIG. 2 is a perspective view of a stand alone electronic gaming machine.

A gaming system in the form of a stand alone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. Other gaming machines may configure for ticket in such that they have a ticket reader for reading tickets having a value and crediting the player based on the face value of the ticker. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit. The top box 26 may also include a display, for example a video display unit, which may be of the same type as the display 14, or of a different type.

Figure 3:
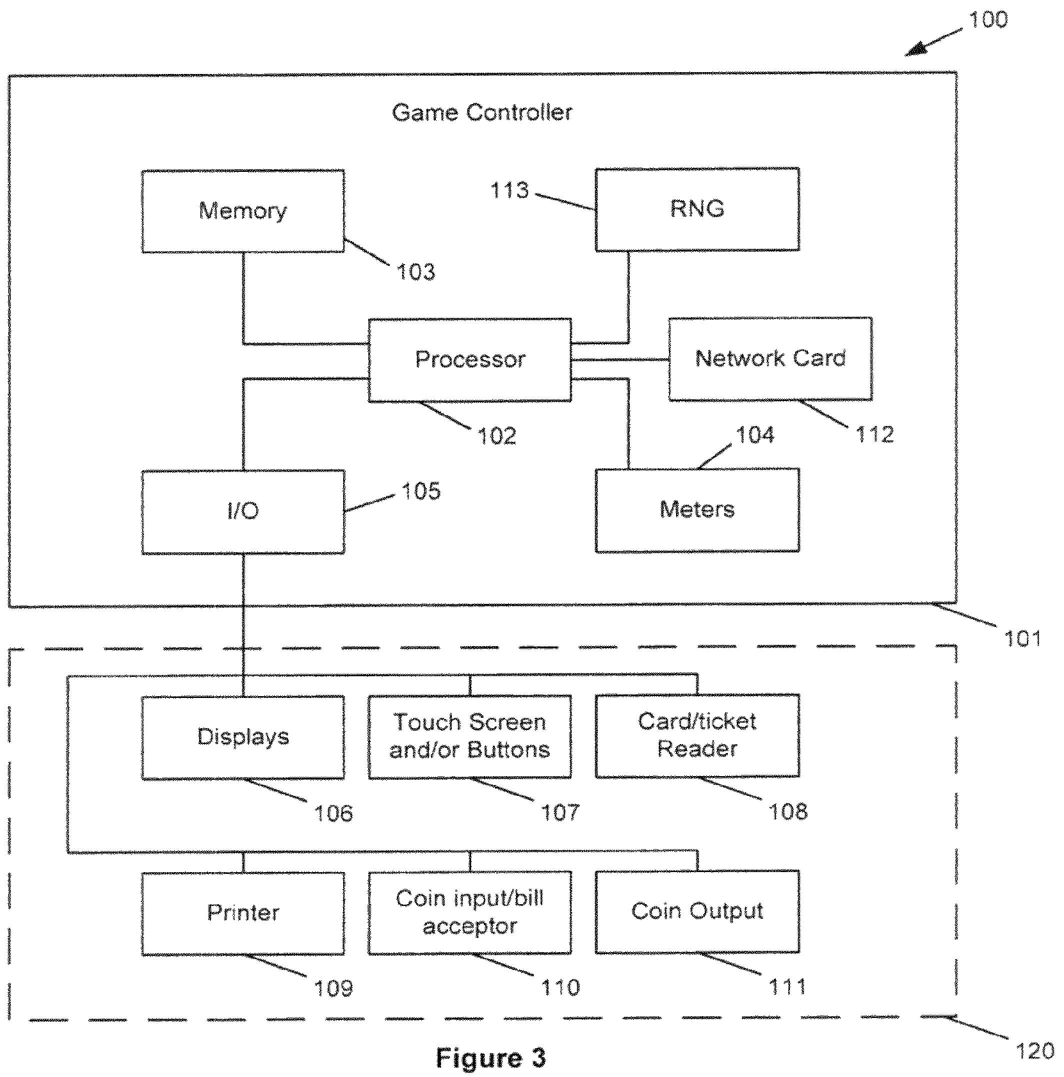
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used. For example, in some gaming machines a mechanical handle is used to initiate a play of the game. Persons skilled in the art will also appreciate that a touch screen can be used to emulate other input devices, for example, a touch screen can display virtual buttons which a player can “press” by touching the screen where they are displayed.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
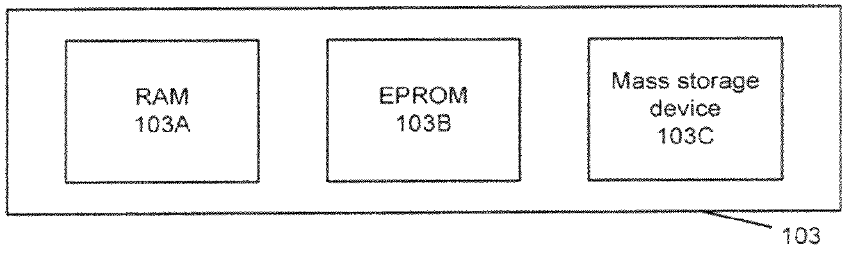
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
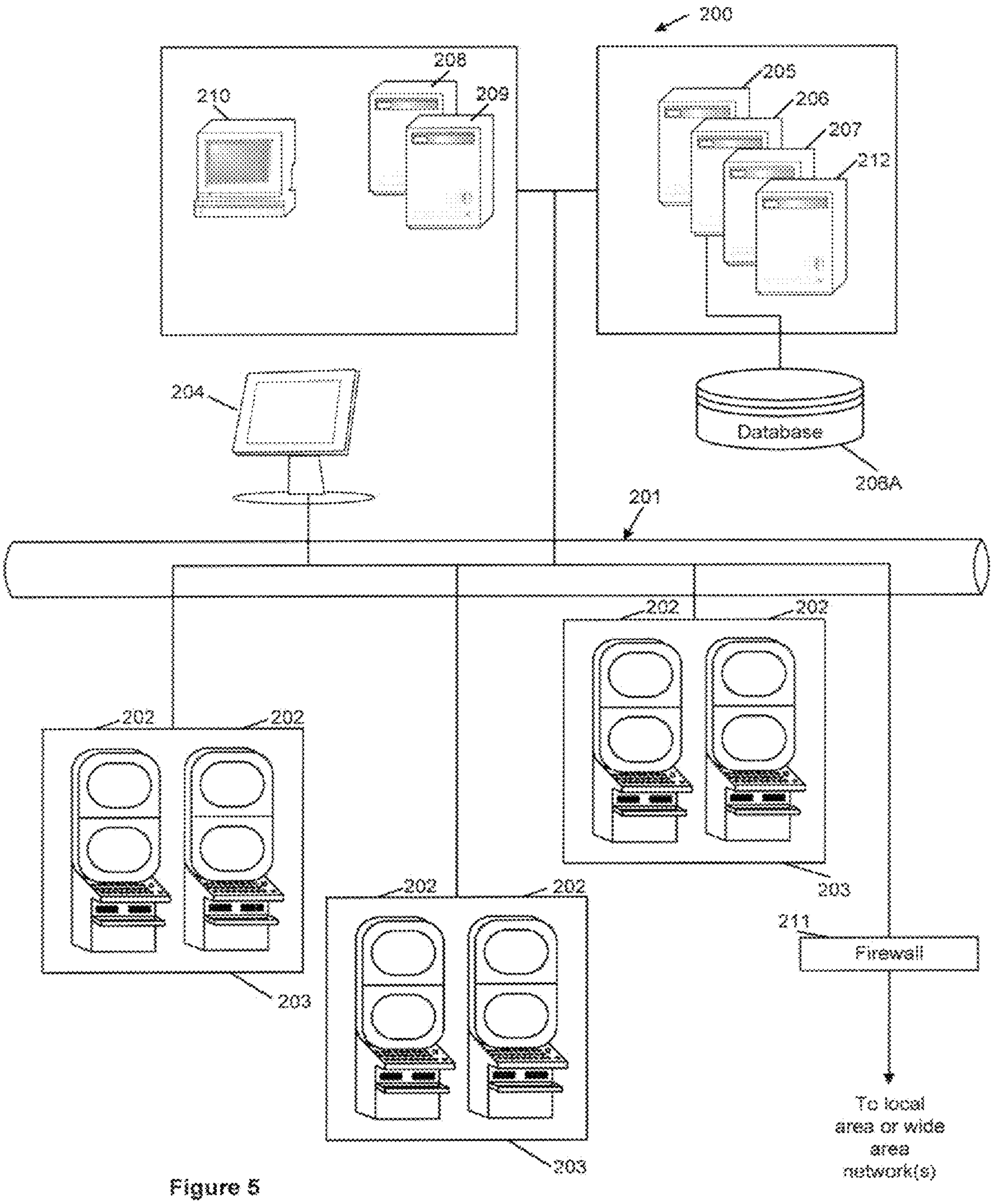
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Further Detail of Gaming System

In the embodiment, the player operates the game play mechanism 56 of player interface 50 to specify a wager and hence the win entitlement which will be evaluated for this play of the game and initiates a play of the game. Persons skilled in the art will appreciate that a player's win entitlement will vary from game to game dependent on player selections. In the embodiment, the game implemented by the gaming system is a spinning reel game. In most spinning reel games, the player's entitlement to be affected by the amount they wager and selections they make (i.e. the nature of the wager). For example, a player's win entitlement may be based on how many win (or pay) lines they play in each game—e.g. a minimum of one line up to the maximum number of lines allowed by the game (noting that not all permutations of win lines may be available for selection) and how much they wager per line. Such win lines are typically formed by a combination of symbol display positions, one from each reel, the symbol display positions being located relative to one another such that they form a line. That is, a game outcome will be generated in which symbols corresponding to the respective reels are stopped with a symbols displayed at designated symbol display positions being evaluated for winning combinations based on the player's selection of win lines and a pay table.

In many games, the player's win entitlement is not strictly limited to the lines they have selected, for example, "scatter" pays are awarded independently of a player's selection of pay lines and are an inherent part of the win entitlement.

Persons skilled in the art, will appreciate that in other embodiments, the player may obtain a win entitlement by selecting a number of reels to play and an amount to wager per reel. Such games are marketed under the trade name "Reel Power" by Aristocrat Leisure Industries Pty Ltd. The selection of the reel means that each displayed symbol of the reel can be substituted for a symbol at one or more designated display positions. In other words, all symbols displayed at symbol display positions corresponding to a selected reel can be used to form symbol combinations with symbols displayed at a designated, symbol display positions of the other reels. For example, if there are five reels and three symbol display positions for each reel such that the symbol display positions comprise three rows of five symbol display positions, the symbols displayed in the centre row are used for non-selected reels. As a result, the total number of ways to win is determined by multiplying the number of active display positions of each reel, the active display positions being all display positions of each selected reel and the designated display position of the non-selected reels. As a result for five reels and fifteen display positions there are 243 ways to win.

Figure 6:
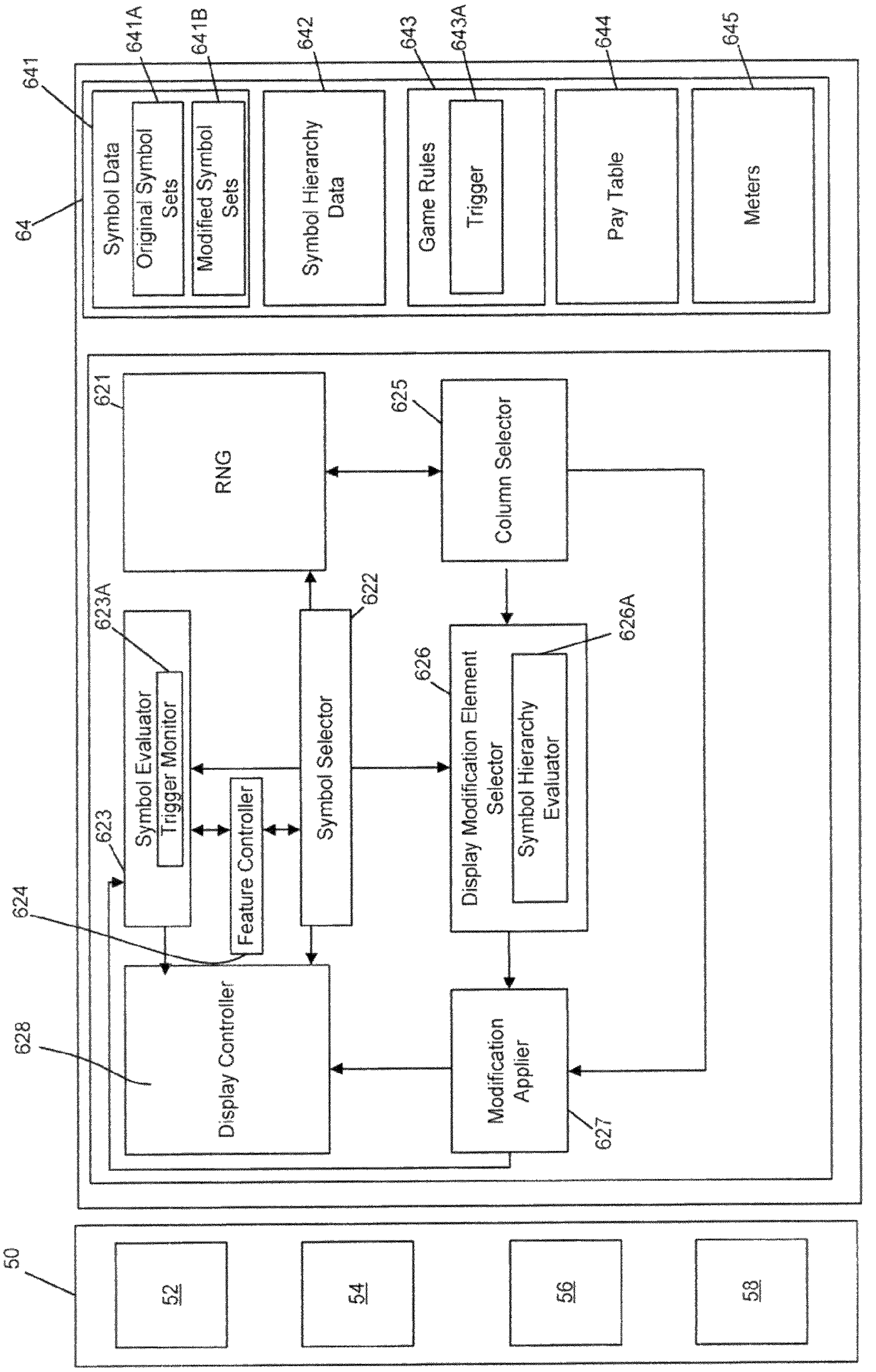
FIG. 6 is a further block diagram of a gaming system.

Once the wager has been placed and the play of the game initiated, the game controller responds to implement a game. In FIG. 6, the processor 62 of game controller 60 is shown implementing a number of modules based on program code and data stored in memory 64. Persons skilled in the art will appreciate that various of the modules could be implemented in some other way, for example by a dedicated circuit.

These modules include the outcome generator 622 which initially operates in response to the player's operation of game play mechanism 56 to carry out a base game. The base game is a part of the game which is carried out each time the player makes a wager, typically irrespective of the wager, whereas the feature the game will only be carried out occasionally, for example, if a condition is met, such as a trigger event occurring. A feature game involves some additional element of game play which usually only occurs when a trigger condition is met. The embodiment, relates primarily to feature games which include a series of free game events are awarded such as free games or re-spins (where some reels are held while others are re-spun) as this provides an opportunity for the display modification elements to make multiple modifications to the symbols which are selected.

The trigger event may be, a symbol combination in the game, occurrence of a specific symbol in the game, purchased, be caused by another connected system, based on turnover, based on a random evaluation, etc.

The first part of forming a game outcome of the base game is for a symbol selector 622 to select symbols from a set of symbols specified by symbol data 641 using random number generator 621. The selected symbols are advised to the display controller 624 which causes them to be displayed on display 54 at a set of display positions.

In this embodiment, the symbols of the base game are selected from a plurality of original symbol sets 641A corresponding to respective ones of a plurality of spinning reels. The symbol sets 641A specify a sequence of symbols for each reel such that the symbol selector 622 can select all of the symbols by selecting a stopping position in the sequence. In one example, three symbols of each of five reels may be displayed such that symbols are displayed at fifteen display positions on display 54. It is known to use a probability table stored in memory 64 to vary the odds of a particular stop position being selected. Other techniques can be used to control the odds of particular outcomes occurring to thereby control the return to player of the game.

Once the symbols have been selected, a symbol evaluator 623 evaluates the displayed symbols based on the selectable lines and the pay table 644 to determine whether the player is entitled to any awards based on the pay table. In the embodiment, the symbol evaluator 623 also includes a trigger monitor 623A which monitors to see whether a trigger condition 643A stored in the memory 64 has been met by the selected symbols. When the designated trigger event occurs, a feature game is initiated in accordance with the game rules 643. In this embodiment, the feature game involves carrying out a plurality of game rounds in which fresh symbols are selected for display and the symbols of a reel are modified. In the embodiment, the symbols of a reel are modified by being replaced with wild symbols which can substitute with other symbols in order to form winning combinations as defined by the pay table 644.

Once the feature game is triggered, a feature controller 624 controls the plurality of game rounds. The number of game rounds can be fixed for the feature game or can vary, for example, with different trigger conditions, such different numbers of scatter symbols, resulting in different numbers of game rounds being conducted.

In the embodiment, the display 54 is modified to include display modification elements below each reel upon the feature being triggered. In the embodiment, these display modification elements correspond to animated volcanoes which have three possible states: a dormant state, an active state and an erupting state. Persons skilled in the art will appreciate that the display modification elements could also be displayed in a dormant state while the base game is being carried out.

The feature controller 624 also causes the symbol selector 622 to select a fresh set of symbols at the beginning of each game round. These symbols are displayed at the display positions. Once the symbols have been selected, the display modification element selector 626 determines which of the display modification elements will be activated as will be described further. In this embodiment, the determination involves deciding which of the volcanoes will have their animation changed from the dormant to the active state.

Also as part of each game round, one of the columns of display positions (in this embodiment corresponding to a reel) is selected at random by column selector 625 using random number generator 621. In this respect it will be appreciated that the column selection can occur at the same time, prior to or after the symbol selection of the game round. In the embodiment, each of the columns can be selected with equal probability. The selected column is advised to the display modification element selector which determines that the display modification element associated with the selected column will be one of the activated elements.

The display modification element selector includes a symbol hierarchy evaluator 626A which evaluates the selected symbols based on the symbol hierarchy data 642 as part of determining which other display modification elements should be activated. The symbol hierarchy evaluator does this to identify the highest winning combination (according to the hierarchy) which could be completed by a modification being applied to a column. This may be any of the columns including the column selected for modification.

An example of a symbol hierarchy where one of the symbols is a 'CHIEF' symbol is set out in Tables 1 to 3 below:

TABLE 1

| CHIEF appears on reels | One of the potential animation is guaranteed to be played below reel |
|---|---|
| 1, 2, 3, 4 | 5 |
| 1, 2, 3, 5 | 4 |
| 1, 2, 4, 5 | 3 |
| 1, 3, 4, 5 | 2 |
| 2, 3, 4, 5 | 1 |

TABLE 2

| CHIEF appears on reels | One of the potential animation is guaranteed to be played below reel |
|---|---|
| 2, 3, 5 | 1 |
| 2, 3, 4 | 1 |
| 1, 3, 5 | 2 |
| 1, 3, 4 | 2 |
| 1, 2, 5 | 3 |
| 1, 2, 4 | 3 |
| 1, 2, 3 | 4 |

TABLE 3

| CHIEF appears on reels | One of the potential animation is guaranteed to be played below reel |
|---|---|
| 1, 2 | 3 |
| 1, 3 | 2 |
| 2, 3 | 1 |

As shown in Table 1, in the example, the symbol hierarchy evaluator 626A first determines whether four CHIEF symbols appear on the reels. If four CHIEF symbols appear on the reels, the display modification element selector 626 determines that one of the animations must be displayed on the display modification element corresponding the reel on which the CHIEF symbol does not appear. If there are not four of a kind CHIEF, the test of table 1 is skipped and the method involves proceeding to table 2 which conducts and determining if there are three of a kind CHIEF on the reel.

If there are three of a kind CHIEF, the symbol hierarchy evaluator 626A determines which of the reels could potentially result in the highest winning symbol combination in the symbol hierarchy. Accordingly, if the chief symbol appears on reels 2, 3 and 4 and wins are evaluated left to right, then the symbol hierarchy evaluator 626A determines the first reel could result in the highest winning combination in the hierarchy. In contrast, if symbols appear on the first second and fourth reels, the symbol hierarchy evaluator **626*a*** determines that the third reel would be the reel which could potentially result in the highest winning combination.

Accordingly, it will be appreciated that in this example, the symbol hierarchy data 642 specifies that symbols are evaluated in a designated order of symbols as an outer loop and as an inner loop based on the number of symbols.

If there the CHIEF symbol is not located the tests of Tables 1, 2 and 3 is repeated for all of the other symbols which could be selected except for scatter symbols until a reel is identified or it is determined that there is no winning combination corresponding to the hierarchy Accordingly, once the hierarchy has been evaluated, the identity of at least one display modification element and possibly two display modification elements are known to the display modification element selector 626. There will be one determined display modification element if the column selector selected the same reel as the reel which corresponds to the highest winning combination according to the symbol hierarchy or no winning combination was identified. There will be two determined display modification elements if the column selector selected the same reel as the reel which corresponds to the highest winning combination according to the symbol hierarchy. In the embodiment, the display modification element selector 626, is arranged to select three volcanoes to be changed to an active state. To complete the set of three volcanoes, either one or two reels are selected at random. It will be appreciated that in other embodiments, a different a designated number of reels may have a display modification element changed to active.

After each of the display modification elements are displayed as active, the modification applier 627 changes the display modification element corresponding to the selected column (reel) to an award state. In this example the award state corresponds to the volcano erupting. The modification applier also applies the modification to the selected column. In this example this involves changing all of the symbols of the selected column to wild symbols. The symbol evaluator 623 then evaluates the symbols as modified against the pay table 644 to determine whether the whether any awards are to be made and any awards are added to the wind meter stored as meter data 645. In the embodiment, the modification applier also modifies the symbol set 641B to be used in subsequent game rounds. Accordingly, the symbols not only replace the symbols displayed at display positions but replace them at their positions within the symbol sets to form modified symbol sets 641B. Accordingly, in subsequent game rounds there will be wild symbols in the symbol set instead of the previously selected symbols. This increases the chance of winning outcomes occurring in subsequent game rounds. Once the symbols have been evaluated, the feature controller 624 determines whether the feature games have been completed and if not controls the symbol selector 622 to select a fresh set of symbols. The process is then repeated by evaluating the symbols based on the symbol hierarchy, selecting the column and determining which display modification elements to activate etc. The process continues under control of the feature controller until all of the free game rounds are exhausted.

Persons skilled in the art will appreciate that in other embodiments, the symbol hierarchy may be implemented differently. For example, the symbol hierarchy may only be available for a small set of the symbols. Alternatively, the symbol hierarchy may involve repeating the test of Table 1 in respect of all symbols before proceeding to carrying out the test of Table 2 in respect of these symbols in a defined order etc. Other techniques for implementing a symbol hierarchy will be apparent to persons skilled in the art. In other embodiments, the modification may only be applied to a subset of the symbols of the columns. For example the top and bottom symbols in the column.

Figure 7:
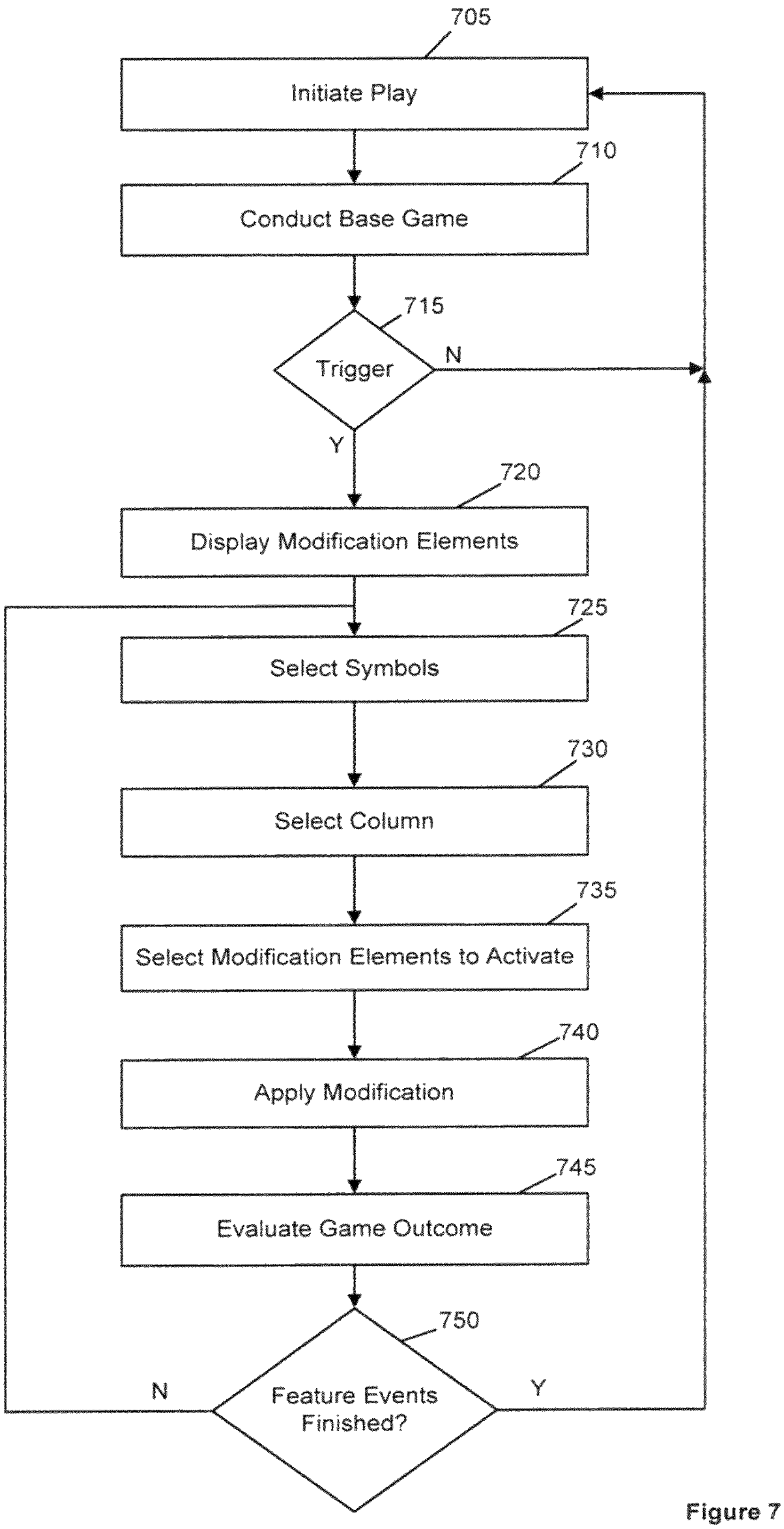
FIGS. 7 and 8 are flow charts of an embodiment.
Figure 8:
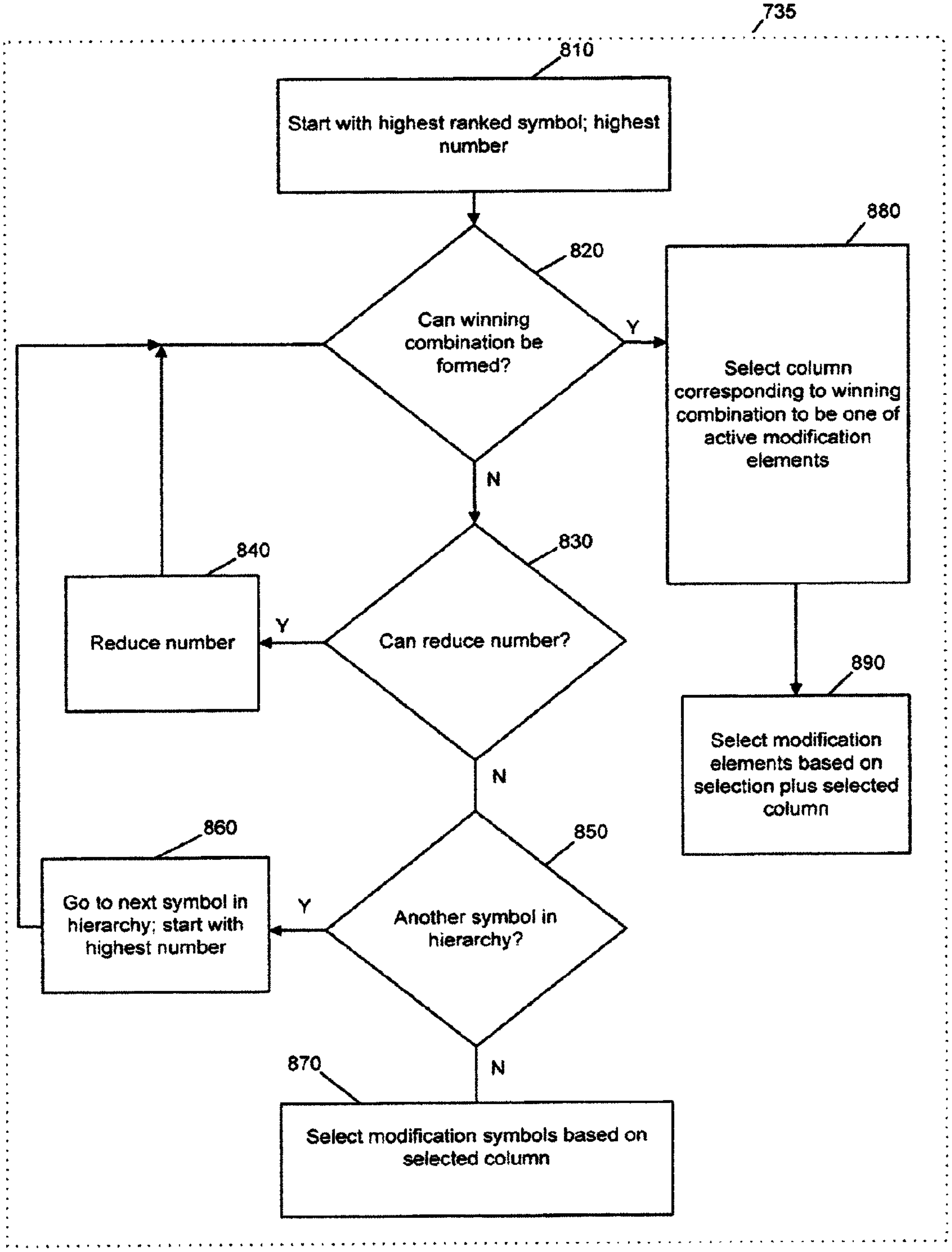

The method of the embodiment is summarized in FIGS. 7 and 8. As indicated in FIG. 7, the method starts with a player initiating a play of the game 705. A base game is then conducted 710 by the game controller. At step 715 it is determined whether a trigger condition has been met and if not, the player must initiate a further play of the game to have a chance at initiating a feature game. In the embodiment once the trigger condition does occur, the method involves displaying the modification elements 720. The method then involves selecting symbols 725, selecting a column 730, determining modification elements to activate 735, applying the modification 740 and evaluating the game outcome for the game round by comparing the selected symbols with the pay table 644. The method 700 then involves determining whether the feature games have finished and, if not, selecting a first further set of symbols. Once the feature games are finished, the player reverts to initiating a further play of the game.

Further detail of step 735 is shown in FIG. 8. As indicated in FIG. 8, the method of determining modification elements to activate involves evaluating a symbol hierarchy starting with the highest symbol and the highest number. The method then involves determining whether adding an additional symbol with result in a winning combination and if so, which symbol will result in the highest winning combination 880. The display modification element is then selected based on the result of the evaluation as to which column could result in the highest winning combination and the column which is selected at random by the column selector 625.

If a winning combination is not formed the number is reduced provided that it is determined 860 that thus is possible (i.e. the lowest number of winning symbols has not being reached. If the symbol number can be reduced, the number is reduced 840 and the test 820 is applied again. Once all the potential winning combinations for the first symbol in the hierarchy have been exhausted, it is then determined 850 whether there is another symbol in the hierarchy. If there is no further symbol in the hierarchy the symbols are selected purely based on the selected purely based on the selected. Otherwise the method involves going 860 to the next symbol in the hierarchy and starting with the highest number before repeating the test.

Figure 9:
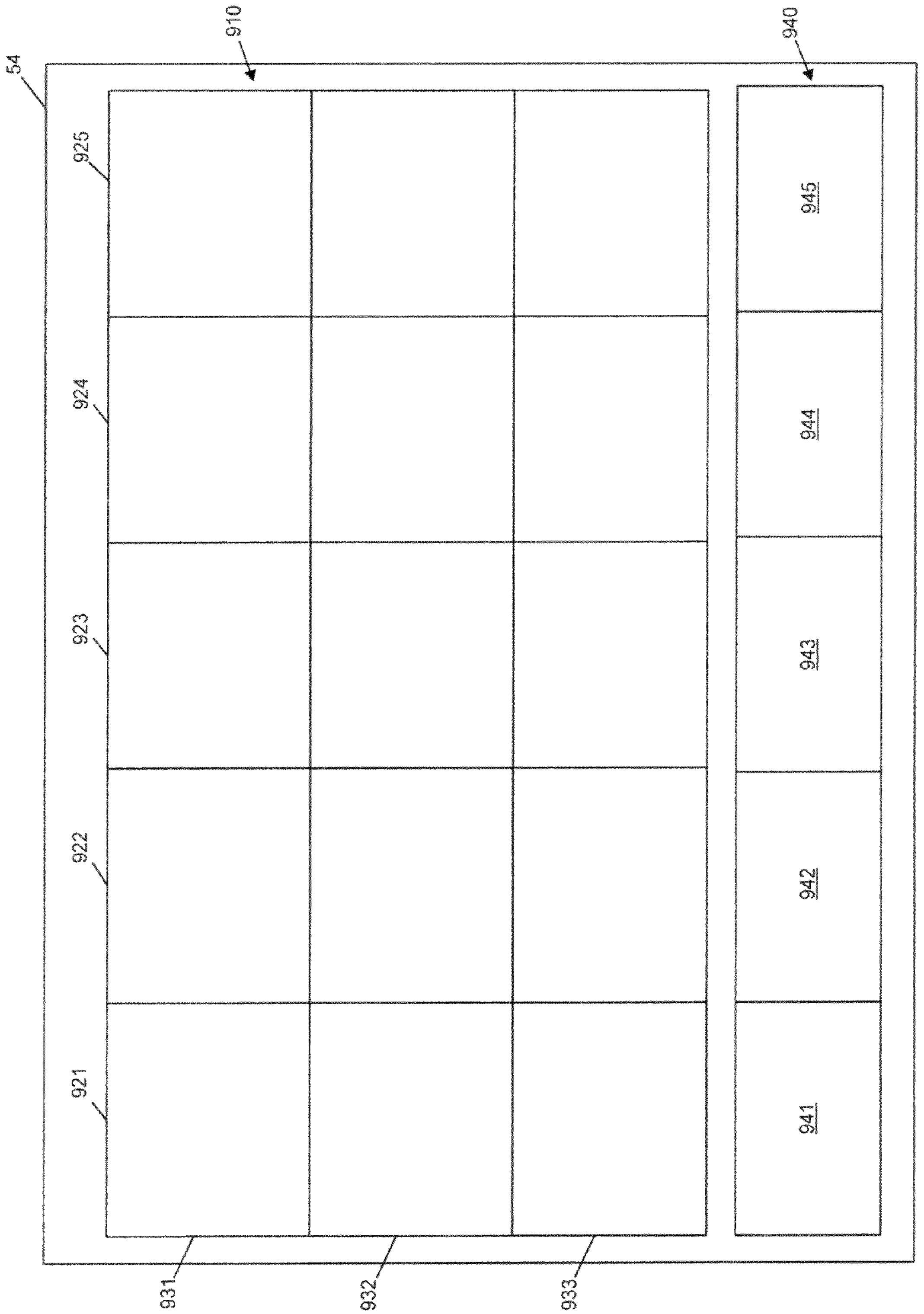
FIG. 9 is an example of a display of an embodiment.

FIG. 9 shows an example of a display 54 of the embodiment. The display 54 has a set 910 of symbol display positions comprising fifteen symbol display positions which selected symbols may be displayed arranged in three rows 931, 932, 933 and five columns 921 to 925 corresponding to respective ones of five spinning reels. Beneath the symbol display positions is a set of display modification elements 940. The individual display elements 941 to 945 are associated respectively with different columns 921 to 925 by being displayed below the columns. As the animated display modification elements 941 to 945 will include not only the selected reel but, if different, also the reel corresponding to the highest possible winning combination, the player's anticipation of an advantageous modification to the displayed symbols is heightened during the feature game.

In some embodiments, an eligibility criteria may be applied in order for the player to be eligible to play the feature game or for the player to have access to the symbol modification feature during the feature game, for example that the player has made a certain sized wager, made an ante bet, selected all win lines, played sufficient games, or the player is a member of a loyalty program.

As indicated above, the feature game involves carrying out a plurality of game rounds. A game round involves at least one of the reels being "spun"—e.g. new symbols of the reels are selected for display at the display positions and the reel is either physically or virtually spun to a stop. Persons skilled in the art will appreciate that there may be more than one game round in a play of a gaming system such as when a feature game is awarded as described above. The outcome of a game round may be no win, a win (for example from a winning combination of symbols), a contribution towards a win accrued over a plurality of game rounds, a trigger condition occurring etc. Typically, a win will result in some form of award being made such as an award of credits. Such an award may never actually be physically received by a player. For example, many gaming systems provide a player with a double or nothing gamble feature, where the player can double or forfeit their credits before commencing another play of the game or cashing out. Further, as credits are fungible, once credits have been added to the credit meter it is not possible to distinguish between credits which exist because the player has input cash or the like and credits resulting from an award.

Further aspects of the method will be apparent from the above description of the system. It will be appreciated that at least part of the method will be implemented electronically, for example, digitally by a processor executing program code such as in the above description of a game controller. In this respect, in the above description certain steps are described as being carried out by a processor of a gaming system, it will be appreciated that such steps will often require a number of sub-steps to be carried out for the steps to be implemented electronically, for example due to hardware or programming limitations. For example, to carry out a step such as evaluating, determining or selecting, a processor may need to compute several values and compare those values.

As indicated above, the method may be embodied in program code. The program code could be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the program code can be executed by different devices, for example in a client server relationship. Persons skilled in the art, will appreciate that program code provides a series of instructions executable by the processor.

It will be understood to persons skilled in the art of the invention that many modifications may be made without departing from the spirit and scope of the invention, in particular it will be apparent that certain features of embodiments of the invention can be employed to form further embodiments.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method of electronic gaming for use with a gaming system having a display and a controller, the method comprising:

(a) displaying a plurality of symbol display positions on the display, the display positions being arranged in a plurality of columns;

(b) displaying a plurality of display modification elements in association with respective ones of each of the plurality of columns;

(c) selecting via the controller a plurality of symbols for display at the plurality of display positions;

(d) evaluating via the controller the selected symbols based on a symbol combination hierarchy to identify a column corresponding to a highest winning symbol combination in the symbol combination hierarchy which would be completed by a designated modification of one or more symbols to be applied to one of the columns;

(e) selecting via the controller a column in which to apply the designated modification;

(f) selecting via the controller a designated number of the plurality of display modification elements to be in a subset of the plurality of display modification elements changed to an active state, the selection being performed so as to include the display modification element corresponding to the selected column and any display modification element corresponding to the column identified by the evaluation;

(g) changing display of the selected subset of display modification elements to an active state;

(h) applying via the controller the designated modification to the selected column subsequent to changing the subset of display modification elements to an active state; and (i) evaluating via the controller the symbols displayed at the display positions subsequent to the modification being applied to determine whether to make one or more awards.

2. A method as claimed in claim 1, wherein the designated modification is replacement of the one or more symbols in the selected column with a designated symbol.

3. A method as claimed in claim 2, wherein the designated symbol is a wild symbol which substitutes with other symbols in the formation of combinations of symbols.

4. A method as claimed in claim 1, comprising applying the modification to each symbol of the selected column.

5. A method as claimed in claim 1, wherein selecting symbols for each column comprises selecting symbols from respective ones of a plurality of sets of symbols corresponding to respective ones of the columns.

6. A method as claimed in claim 5, wherein the modification further comprises modifying the symbol set corresponding to the selected column such that in a subsequent selection of symbols for display at the symbols, the symbol set includes any prior modification.

7. A method as claimed in claim 5, wherein each symbol set corresponds to a reel of symbols arranged in a defined order.

8. A method as claimed in claim 7, wherein the plurality of game rounds are conducted in response to a trigger condition being met in a base game.

9. A method as claimed in claim 5, comprising conducting a plurality of game rounds, each comprising steps (a) to (i).

10. A method as claimed in claim 1, wherein there are five columns of display positions such that there are five display modification elements and three display modification elements are changed to the active state.

11. A method as claimed in claim 1, wherein changing display of the display modification elements to an active state comprises changing the display from a dormant state change to an active state.

12. A method as claimed in claim 1, comprising changing display of the display modification element corresponding to the selected column to an award state as part of applying the designated modification.

13. A method as claimed in claim 1, wherein each display modification element is an animated volcano.

14. A method as claimed in claim 13, wherein the symbols are evaluated left to right.

15. A method as claimed in claim 13, wherein the evaluation of the selected symbols in step (d) is based on the defined order of columns.

16. A game controller as claimed in claim 13, wherein the evaluation of the selected symbols based on a symbol combination hierarchy is based on the defined order of columns.

17. A method as claimed in claim 1, wherein the symbols are evaluated in step (i) based on a defined order of the columns.

18. A method as claimed in claim 1, wherein each symbol combination in the symbol combination hierarchy comprises a plurality of the same symbol, different numbers of the same symbol are winning combinations, and there are winning combinations of symbols corresponding to different symbols.

19. A method as claimed in claim 18, wherein the symbol hierarchy is defined by the symbols such that identifying a highest winning symbol combination in the symbol hierarchy comprises identifying a symbol combination corresponding to a highest winning number of a highest symbol in the symbol hierarchy and each winning number of the highest symbol is evaluated prior to evaluating winning numbers of the next symbol in the symbol hierarchy.

20. A method as claimed in claim 18, wherein the symbol hierarchy is defined by both the symbols and the number of symbols such that identifying a highest winning symbol combination in the symbol hierarchy comprises identifying a symbol combination corresponding to a highest winning number of symbols starting with a highest symbol in the symbol hierarchy and proceeding to the next highest each winning number of the highest symbol subsequent to evaluating the highest winning number of symbols in respect of all symbols in the symbol hierarchy.

21. A method as claimed in claim 1, wherein step (f) comprises randomly selecting sufficient display modification elements to complete the designated number by supplementing the display element corresponding to the selected column and any display modification element corresponding to the column identified by the evaluation.

22. A method as claimed in claim 1, wherein step (e) precedes at least step (d).

23. A gaming system as claimed in claim 1, wherein the modification applier applies the modification to each symbol of the selected column.

24. A gaming system as claimed in claim 1, wherein the symbol selector selects symbols for each column by selecting symbols from respective ones of a plurality of sets of symbols stored in a memory of the gaming system, the sets of symbols corresponding to respective ones of the columns.

25. A gaming system as claimed in claim 24, wherein the modification applier modifies the symbols of the symbol set stored in memory for the respective column such that in any subsequent selection of symbols for display at the symbols, the symbol sets include any prior modification.

26. A gaming system as claimed in claim 24, wherein each symbol set corresponds to a reel of symbols arranged in a defined order.

27. A gaming system as claimed in claim 24, arranged to conduct a plurality of game rounds, each of the symbol selector, symbol hierarchy evaluator, column selector, display modification element selector, modification applier and symbol evaluator operating in each of the game rounds.

28. A gaming system as claimed in claim 27, comprising a trigger monitor arranged to monitor for a trigger condition being met in a base game and to initiate the plurality of game rounds in response to the trigger condition being met.

29. A game controller as claimed in claim 1, wherein each symbol combination in the symbol combination hierarchy comprises a plurality of the same symbol, different numbers of the same symbol are winning combinations, and there are winning combinations of symbols corresponding to different symbols.

30. A game controller as claimed in claim 29, wherein the symbol hierarchy is defined by the symbols such that the game controller identifies a highest winning symbol combination in the symbol hierarchy by identifying a symbol combination corresponding to a highest winning number of a highest symbol in the symbol hierarchy and each winning number of the highest symbol is evaluated prior to evaluating winning numbers of the next symbol in the symbol hierarchy.

31. A game controller as claimed in claim 29, wherein the symbol hierarchy is defined by both the symbols and the number of symbols such that the game controller identifies a highest winning symbol combination in the symbol hierarchy by identifying a symbol combination corresponding to a highest winning number of symbols starting with a highest symbol in the symbol hierarchy and proceeding to the next highest each winning number of the highest symbol subsequent to evaluating the highest winning number of symbols in respect of all symbols in the symbol hierarchy.

32. A method as claimed in claim 1, further comprising executing with a processor computer program code.

33. A method as claimed in claim 32, further comprising storing said computer program code in a tangible computer readable medium.

34. A gaming system comprising:

a display arranged to display a plurality of symbol display positions on a display, the display positions being arranged in a plurality of columns and a plurality of display modification elements in association with respective ones of each of the plurality of columns;

a symbol selector arranged to select a plurality of symbols for display at the plurality of display positions;

a symbol hierarchy evaluator arranged to evaluate the selected symbols based on a symbol combination hierarchy to identify a column corresponding to a highest winning symbol combination in the symbol combination hierarchy which would be completed by a designated modification of one or more symbols to be applied to one of the columns;

a column selector arranged to select a column in which to apply the designated modification;

a display modification element selector arranged to select a designated number of the plurality of display modification elements to be in a subset of the plurality of display modification elements changed to an active state, the selection being performed so as to include the display modification element corresponding to the selected column and any display modification element corresponding to the column identified by the evaluation, the display of the selected subset of display modification elements on the display being changed to an active state;

a modification applier arranged to apply the designated modification to the selected column subsequent to changing the subset of display modification elements to an active state;

and a symbol evaluator arranged to evaluate the symbols displayed at the display positions subsequent to the modification being applied to determine whether to make one or more awards.

35. A gaming system as claimed in claim 34, wherein the designated modification is replacement of the one or more symbols in the selected column with a designated symbol.

36. A gaming system as claimed in claim 35, wherein the designated symbol is a wild symbol which substitutes with other symbols in the formation of combinations of symbols.

37. A gaming system as claimed in claim 34, wherein there are five columns of display positions such that there are five display modification elements and three display modification elements are changed to the active state.

38. A gaming system as claimed in claim 34, wherein changing display of the display modification elements to an active state comprises changing the display from a dormant state change to an active state.

39. A gaming system as claimed in claim 34, arranged to change display of the display modification element corresponding to the selected column to an award state as part of applying the designated modification.

40. A gaming system as claimed in claim 34, wherein each display modification element is an animated volcano.

41. A gaming system as claimed in claim 34, wherein the symbols are evaluated by the symbol evaluator based on a defined order of the columns.

42. A gaming system as claimed in claim 41, wherein the symbols are evaluated left to right.

43. A gaming system as claimed in claim 41, wherein the evaluation of the selected symbols by the symbol hierarchy evaluator is based on the defined order of columns.

44. A gaming system as claimed in claim 34, wherein each symbol combination in the symbol combination hierarchy comprises a plurality of the same symbol, different numbers of the same symbol are winning combinations, and there are winning combinations of symbols corresponding to different symbols.

45. A gaming system as claimed in claim 44, wherein the symbol hierarchy is defined by the symbols such that symbol hierarchy evaluator identfies a highest winning symbol by identifying a symbol combination corresponding to a highest winning number of a highest symbol in the symbol hierarchy and each winning number of the highest symbol is evaluated prior to evaluating winning numbers of the next symbol in the symbol hierarchy.

46. A gaming system as claimed in claim 44, wherein the symbol hierarchy is defined by both the symbols and the number of symbols such that the symbol hierarchy evaluator identfies a highest winning symbol combination in the symbol hierarchy by identifying a symbol combination corresponding to a highest winning number of symbols starting with a highest symbol in the symbol hierarchy and proceeding to the next highest each winning number of the highest symbol subsequent to evaluating the highest winning number of symbols in respect of all symbols in the symbol hierarchy.

47. A gaming system as claimed in claim 34, wherein the display modification element selector randomly selects sufficient display modification elements to complete the designated number by supplementing the display element corresponding to the selected column and any display modification element corresponding to the column identified by the evaluation.

48. An electronic game controller arranged to:

(a) control a display to display a plurality of symbol display positions on a display, the display positions being arranged in a plurality of columns;

(b) control the display to display a plurality of display modification elements in association with respective ones of each of the plurality of columns;

(c) select a plurality of symbols for display at the plurality of display positions;

(d) evaluate the selected symbols based on a symbol combination hierarchy to identify a column corresponding to a highest winning symbol combination in the symbol combination hierarchy which would be completed by a designated modification of one or more symbols to be applied to one of the columns;

(e) select a column in which to apply the designated modification;

(f) select a designated number of the plurality of display modification elements to be in a subset of the plurality of display modification elements changed to an active state, the selection being performed so as to include the display modification element corresponding to the selected column and any display modification element corresponding to the column identified by the evaluation;

(g) change display of the selected subset of display modification elements to an active state;

(h) apply the designated modification to the selected column subsequent to changing the subset of display modification elements to an active state; and (i) evaluate the symbols displayed at the display positions subsequent to the modification being applied to determine whether to make one or more awards.

49. A game controller as claimed in claim 48, wherein the designated modification is replacement of the one or more symbols in the selected column with a designated symbol.

50. A game controller as claimed in claim 49, wherein the designated symbol is a wild symbol which substitutes with other symbols in the formation of combinations of symbols.

51. A game controller as claimed in claim 48, arranged to apply the modification to each symbol of the selected column.

52. A game controller as claimed in claim 48, arranged to select symbols for each column by selecting symbols from respective ones of a plurality of sets of symbols corresponding to respective ones of the columns.

53. A game controller as claimed in claim 52, wherein the modification further comprises modifying the symbol set corresponding to the selected column such that in a subsequent selection of symbols for display at the symbols, the symbol set includes any prior modification.

54. A game controller as claimed in claim 52, wherein each symbol set corresponds to a reel of symbols arranged in a defined order.

55. A game controller as claimed in claim 52, arranged to conduct a plurality of game rounds by repeatedly selecting symbols, evaluating the selected symbols based on a symbol hierarchy, selecting a column, selecting display modification elements, changing display of selected display modification elements, applying the designated modification and evaluating the modified symbols.

56. A game controller as claimed in claim 55, arranged to conduct the plurality of game rounds in response to a trigger condition being met in a base game.

57. A game controller as claimed in claims 48, wherein there are five columns of display positions such that there are five display modification elements and three display modification elements are changed to the active state.

58. A game controller as claimed in 48, arranged to control change of the display modification elements to an active state by changing the display from a dormant state change to an active state.

59. A game controller as claimed in claim 48, arranged to control change of the display modification element corresponding to the selected column to an award state as part of applying the designated modification.

60. A game controller as claimed in claim 48, wherein the symbols are evaluated to determine whether to make one or more awards based on a defined order of the columns.

61. A game controller as claimed in claim 60, wherein the symbols are evaluated left to right.

62. A game controller as claimed in claim 48, arranged to randomly selecting sufficient display modification elements to complete the designated number by supplementing the display element corresponding to the selected column and any display modification element corresponding to the column identified by the evaluation.

63. A gaming system comprising:

means for displaying a plurality of symbol display positions on a display, the display positions being arranged in a plurality of columns;

means for displaying a plurality of display modification elements in association with respective ones of each of the plurality of columns;

means for selecting a plurality of symbols for display at the plurality of display positions;

means for evaluating the selected symbols based on a symbol combination hierarchy to identify a column corresponding to a highest winning symbol combination in the symbol combination hierarchy which would be completed by a designated modification of one or more symbols to be applied to one of the columns;

means for selecting a column in which to apply the designated modification;

means for selecting a designated number of the plurality of display modification elements to be in a subset of the plurality of display modification elements changed to an active state, the selection being performed so as to include the display modification element corresponding to the selected column and any display modification element corresponding to the column identified by the evaluation;

means for changing display of the selected subset of display modification elements to an active state;

means for applying the designated modification to the selected column subsequent to changing the subset of display modification elements to an active state; and means for evaluating the symbols displayed at the display positions subsequent to the modification being applied to determine whether to make one or more awards.

64. An electronic gaming machine comprising:

an electronic display under control of a display controller arranged to (i) control the display to display a plurality of symbol display positions, the display positions being arranged in a plurality of columns, and (ii) control the display to display a plurality of display modification elements in association with respective ones of each of the plurality of columns; and a processor arranged to execute game program code stored in a memory to implement a game controller arranged to:

(a) select a plurality of symbols for display at the plurality of display positions;

(b) evaluate the selected symbols based on a symbol combination hierarchy to identify a column corresponding to a highest winning symbol combination in the symbol combination hierarchy which would be completed by a designated modification of one or more symbols to be applied to one of the columns;

(c) select a column in which to apply the designated modification;

(d) select a designated number of the plurality of display modification elements to be in a subset of the plurality of display modification elements changed to an active state, the selection being performed so as to include the display modification element corresponding to the selected column and any display modification element corresponding to the column identified by the evaluation;

(e) change display of the selected subset of display modification elements to an active state;

(f) apply the designated modification to the selected column subsequent to changing the subset of display modification elements to an active state; and (g) evaluate the symbols displayed at the display positions subsequent to the modification being applied to determine whether to make one or more awards.

* * * * *